United States Patent
Williams (10) Patent No.: US 11,142,414 B1
(45) Date of Patent: Oct. 12, 2021

(54) METHOD AND ARTICLE FOR STANDING ON ROLLER CONVEYOR

(71) Applicant: Buckeye Corrugated, Inc., Fairlawn, OH (US)

(72) Inventor: Adam Williams, Sugarland, TX (US)

(73) Assignee: Buckeye Corrugated, Inc., Fairlawn, OH (US)

( * ) Notice: Subject to any disclaimer, the term of this patent is extended or adjusted under 35 U.S.C. 154(b) by 0 days.

(21) Appl. No.: 16/868,664

(22) Filed: May 7, 2020

(51) Int. Cl.
  *B65G 69/22* (2006.01)
  *B65G 17/00* (2006.01)
  *B65G 39/10* (2006.01)

(52) U.S. Cl.
  CPC ........... *B65G 69/22* (2013.01); *B65G 17/002* (2013.01); *B65G 39/10* (2013.01)

(58) Field of Classification Search
  CPC ...... B65G 39/20; B65G 69/22; B65G 17/002; B65G 17/005; B66B 21/10; B66B 23/08; B66B 21/04
  USPC .............. 198/321, 867.01, 867.13; 193/35 R
  See application file for complete search history.

(56) References Cited

U.S. PATENT DOCUMENTS

| | | | | |
|---|---|---|---|---|
| 6,170,632 | B1* | 1/2001 | Shimura | ................. B66B 21/12 104/167 |
| 2010/0012456 | A1* | 1/2010 | Magaldi | ............... B65G 17/065 198/321 |
| 2014/0353113 | A1* | 12/2014 | Gschwendtner | ........ F16D 65/14 198/322 |
| 2020/0377342 | A1* | 12/2020 | Michalke | ................ B66B 23/10 |

* cited by examiner

*Primary Examiner* — James R Bidwell
(74) *Attorney, Agent, or Firm* — Emerson, Thomson & Bennett, LLC; Roger D. Emerson (57) ABSTRACT

This disclosure concerns an article and a method for using it. The article enables the user to conveniently stand, temporarily, on the rollers of a roller conveyor. The user sets the article on the roller conveyor, stands on the article, and when finished with his task, steps off the article and removes it from the roller conveyor. The article is made of a material which is light and strong, such as ultra-high molecular weight polyethylene. It features semi-circular recesses in a bottom surface which selectively and operatively receive the rollers of the roller conveyor. Packages can pass on the roller conveyor and the rollers can still turn in many cases, while the package passes next to the article.

8 Claims, 15 Drawing Sheets

METHOD AND ARTICLE FOR STANDING ON ROLLER CONVEYOR

I. BACKGROUND

This invention pertains to the methods, articles, and apparatuses for standing atop of other objects, more specifically for standing on a roller conveyor.

II. SUMMARY

In accordance with one aspect of the present invention, an article and method for using said article is disclosed. The article comprises a platform member which is generally planar and has a preferred width of approximately 30 inches and a preferred depth of about 15 inches. The article ideally has a lower surface into which are cut a plurality of recesses in a curvilinear shape, and even more preferably, a semi-circular shape. In a preferred embodiment, there are ten of these recesses along each side of said article. The article can then be placed upon an associated roller conveyor where associated individual rollers fit within the recesses in a selective and operative way, so that the article can be used for standing on top of a roller conveyor, such as to perform maintenance or to reach things above the conveyor while still allowing the packages on the roller conveyor to travel thereby. The user may find other conveniences by using the inventive article.

In accordance with another aspect of the present invention, the article is made of ultra-high molecular weight polyethylene, sometimes knows as "UHMW."

In accordance with another aspect of the present invention, the platform member is generally planar and has an upper and lower surface. The upper surface of the platform has a first element to enhance friction between the element and the associated feet of an associated user. The element can be something like friction paper or other ridged materials that provide enhanced friction over the normal ultra-high molecular weight polyethylene surface. If desired, visually perceptible warning symbols can be added to enhance the visibility to the associated user.

According to other aspects of the invention, the ideal article has a width between 12 inches and 50 inches, a depth between 6 inches and 60 inches, and a height between 3 inches and 10 inches. According to other aspects of the invention, the article has an ideal thickness between 0.25 inches and 2.0 inches.

In accordance with still another aspect of the present invention, the article can include first and second side members. An upper edge of one of the side members is attached to the lower surface of a platform member. A first side member has a recess which extends from a lower edge of the first side member toward an upper edge of the first side member. The recess has, at least in part, a first curved surface. In the preferred embodiment, the first curved surface is the arc of a circle and the arc extends to approximately 180°, i.e., a semi-circle. The semi-circular shape helps keep the platform member in place, resisting the tendency to move along the longitudinal axis of the roller conveyor. The first curved surface is sized and configured to receive part of the exterior of an associated roller as part of a roller conveyor. In a currently preferred embodiment, the depth of the article does not extend completely across the width of a roller conveyor. Instead, the article could be used on the roller conveyor while boxes of materials can pass by the article. However, in another embodiment of the invention, the article extends completely across the roller conveyor and can be provided as a bridge for an associated user to travel from one side of the roller conveyor to the other.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
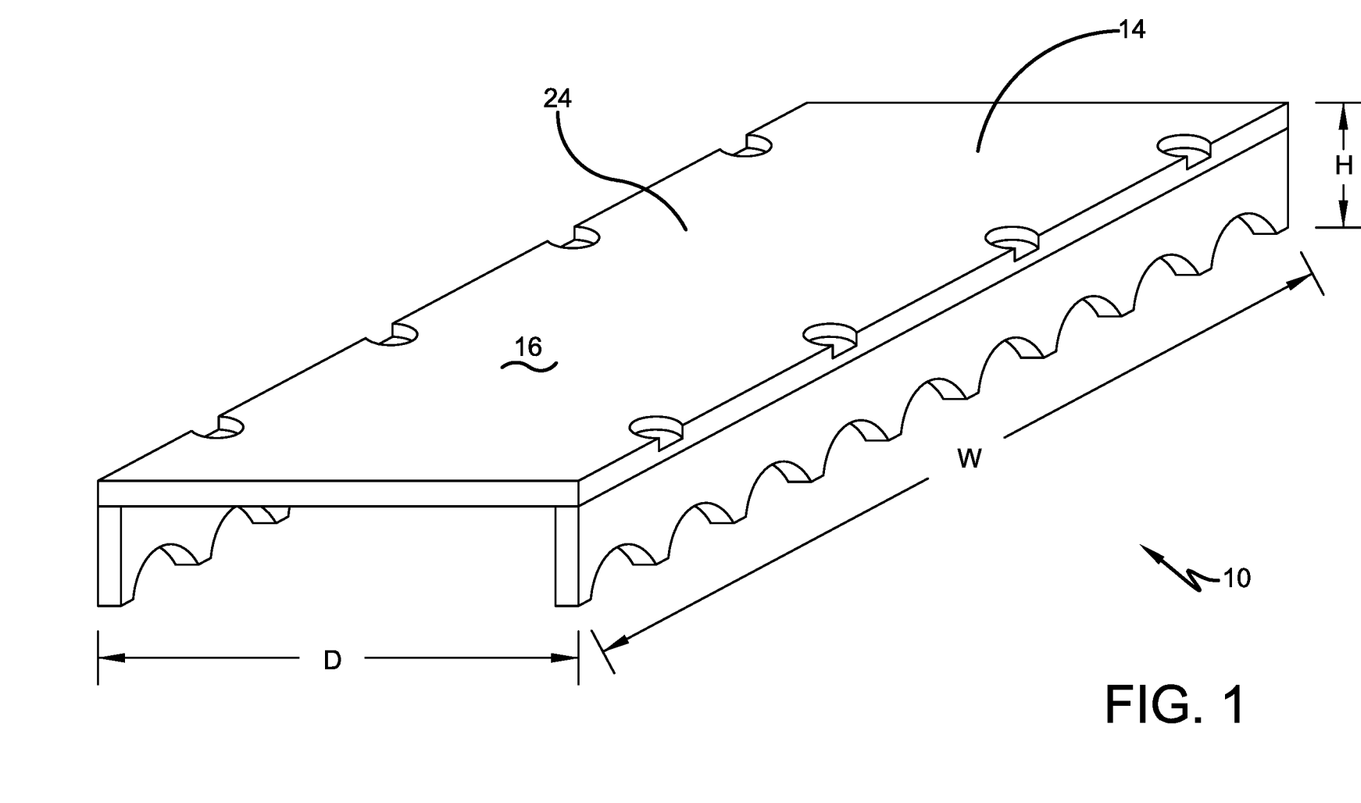
FIG. 1 is a perspective, schematic view of an article according to the invention.

Referring now to the drawings wherein the showings are for purposes of illustrating embodiments of the invention only and not for purposes of limiting the same, and wherein like reference numerals are understood to refer to like components, FIG. 1 shows the article 10. The article includes a platform member 14. The platform member 14 has an upper surface 16.

Figure 6:
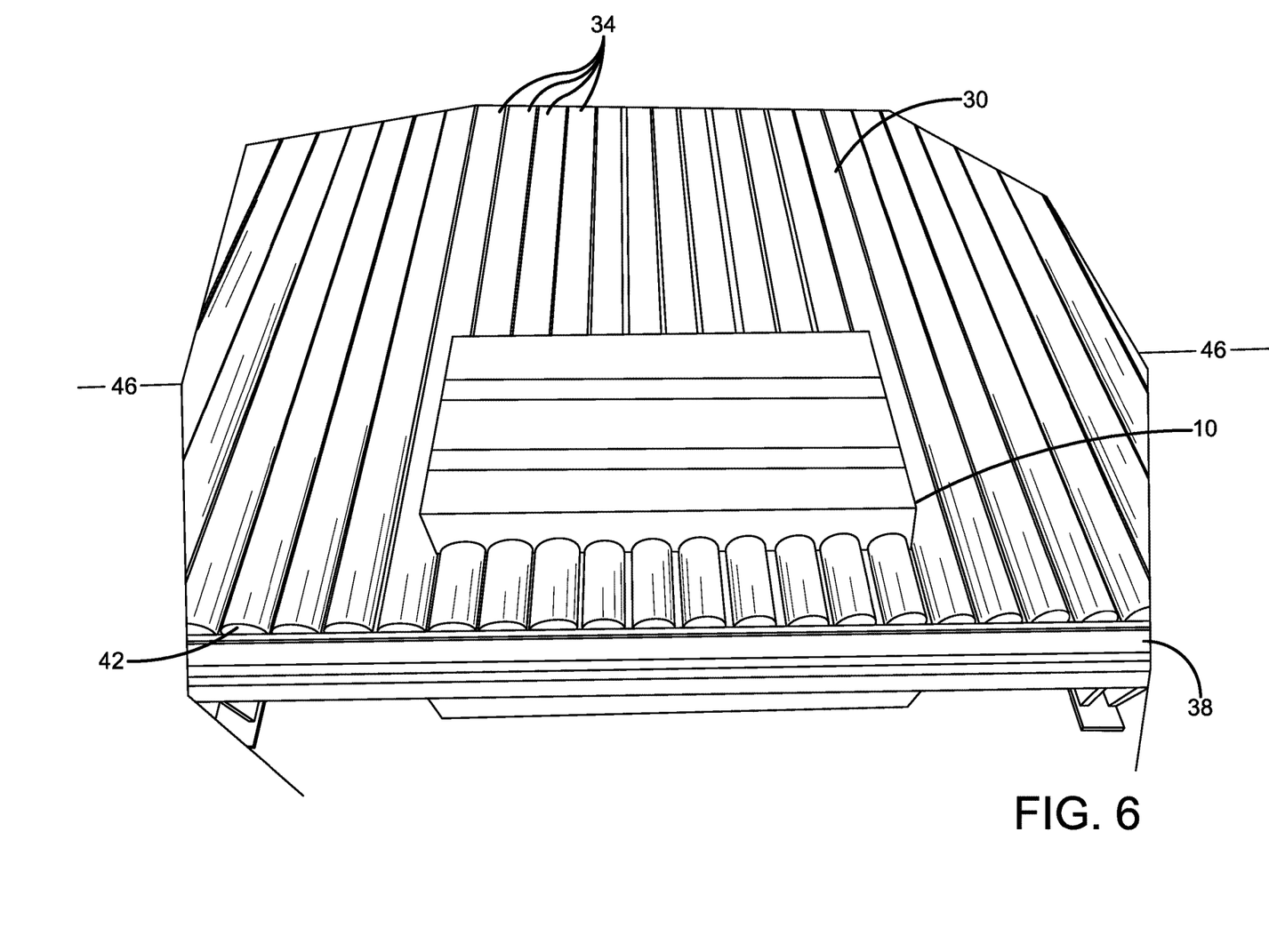
FIG. 6 is a perspective view of the article in place on an associated roller conveyor.
Figure 10:
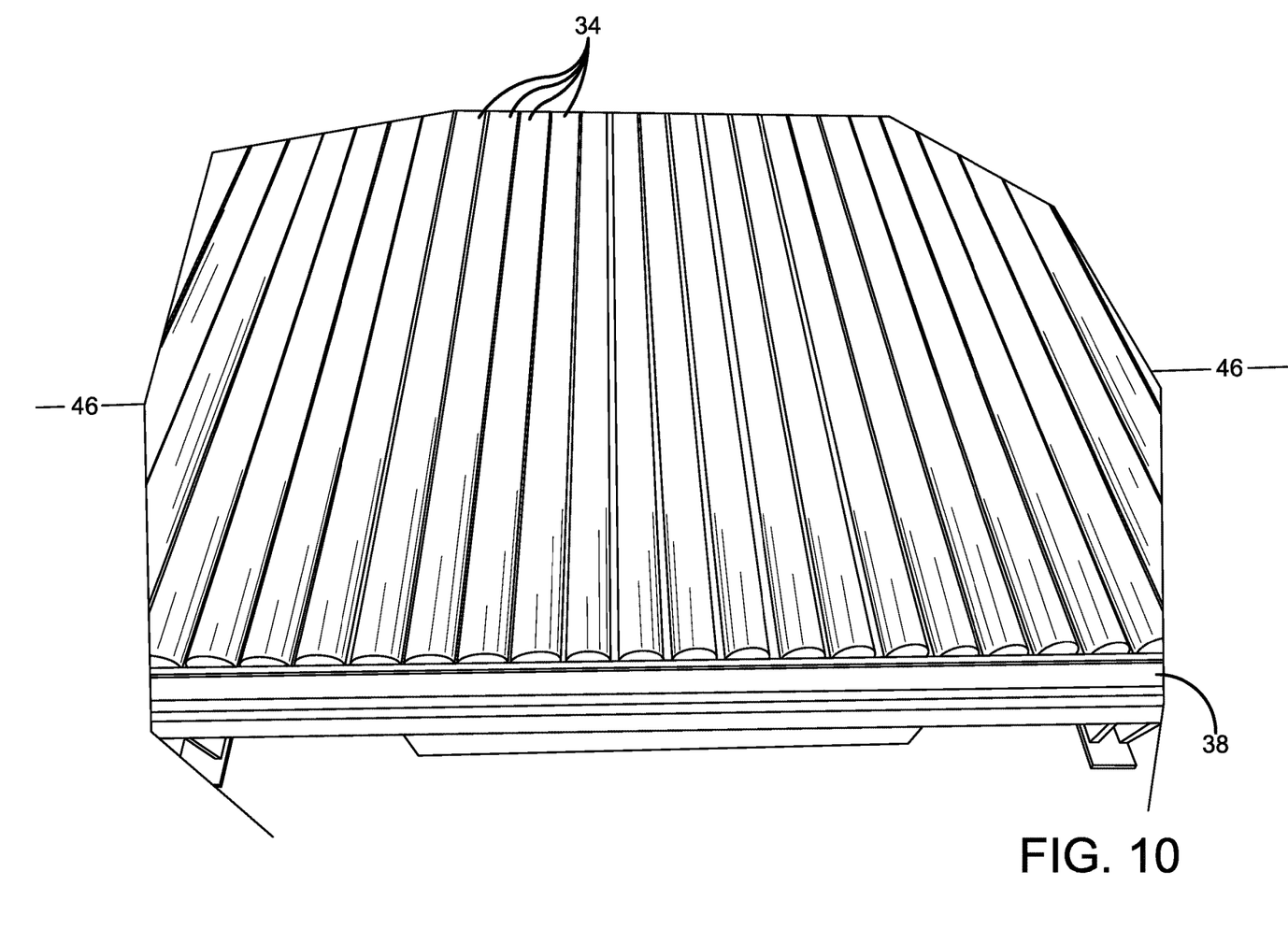
FIG. 10 is a perspective view of a typical associated roller conveyor.
Figure 13:
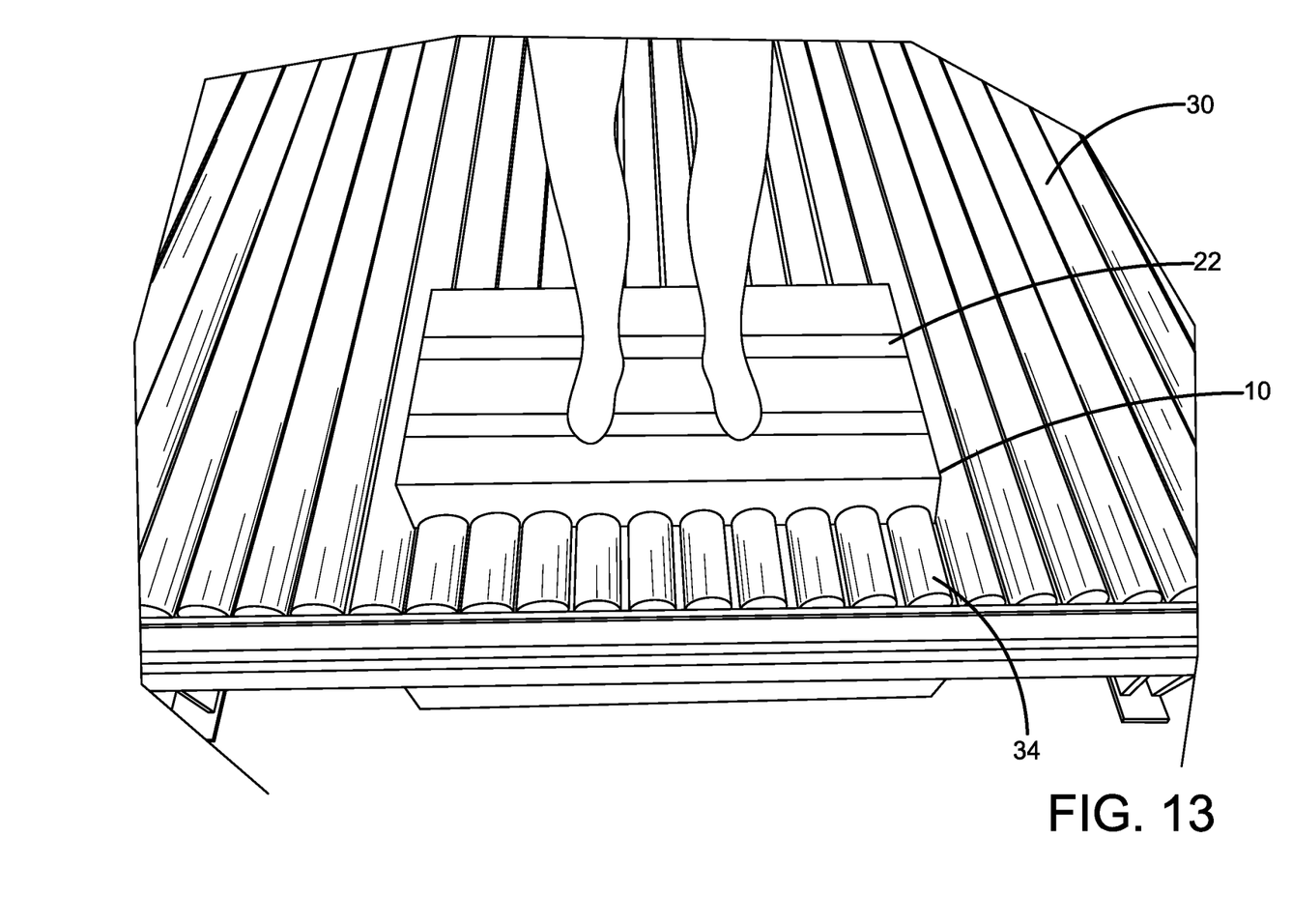
FIG. 13 shows a perspective view of the article in use on a roller conveyor with the associated feet of an associated user in place on top of the top surface of the article.

With continued reference to FIG. 1, the article 10 has a width (W), a depth (D), and a Height (H). In the preferred embodiment, the width (W) is about 30 inches, the depth (D) is about 15 inches, and the height (H) is about 4 inches. However, the article can advantageously be employed with a width (W) of between 12 inches and 50 inches, a depth (D) between 6 inches and 60 inches, and a height (H) between 3 inches and 10 inches. In fact, the depth can extend beyond 60 inches and go completely across the entire width of an associated roller conveyer, if the article is to be used as a bridge over the conveyor. Many of the dimensions of the article 10 can be modified with still good effect as the article 10 is designed to be associated with an associated roller conveyor, as is illustrated in FIG. 6, FIG. 10, and FIG. 13.

Figure 2A:
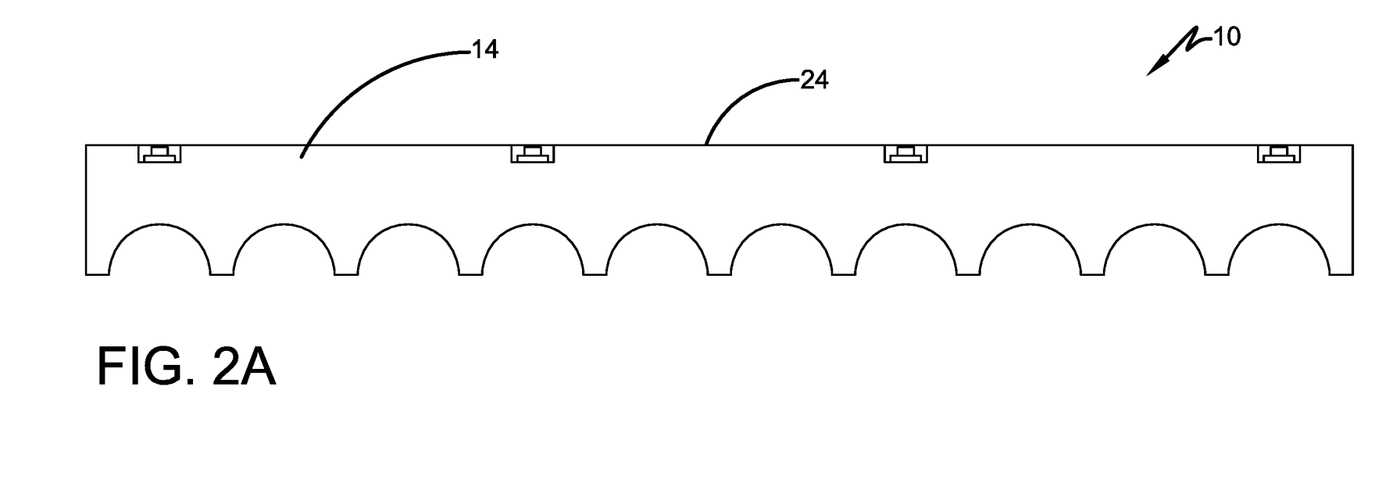
FIG. 2A and FIG. 2B are side views showing the width of the first and second side members.
Figure 2B:
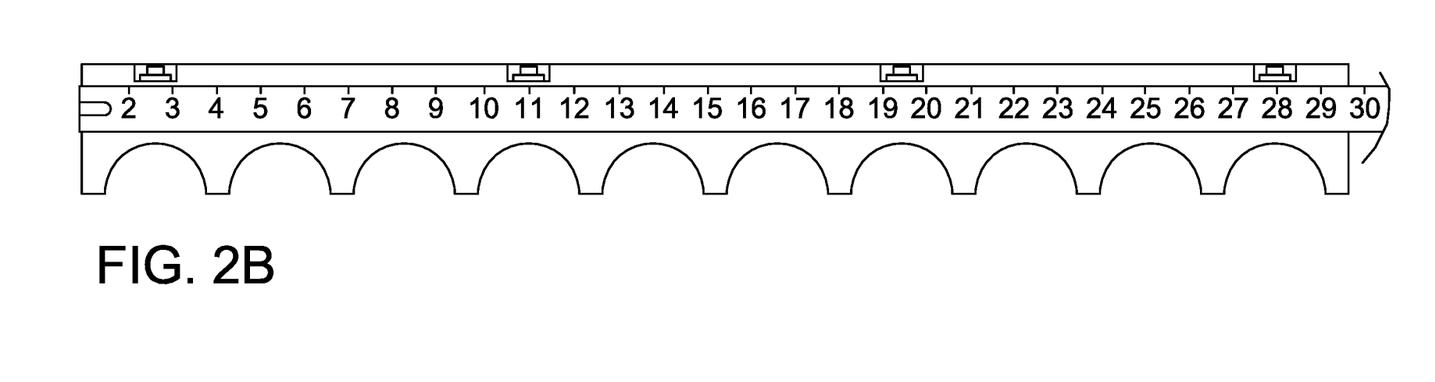

With reference to FIG. 2A and FIG. 2B, a side view of the article 10 is shown. In FIG. 2A, the article is shown without a measurement tool, while FIG. 2B shows the article with a measurement tool superimposed over it.

Figure 3A:
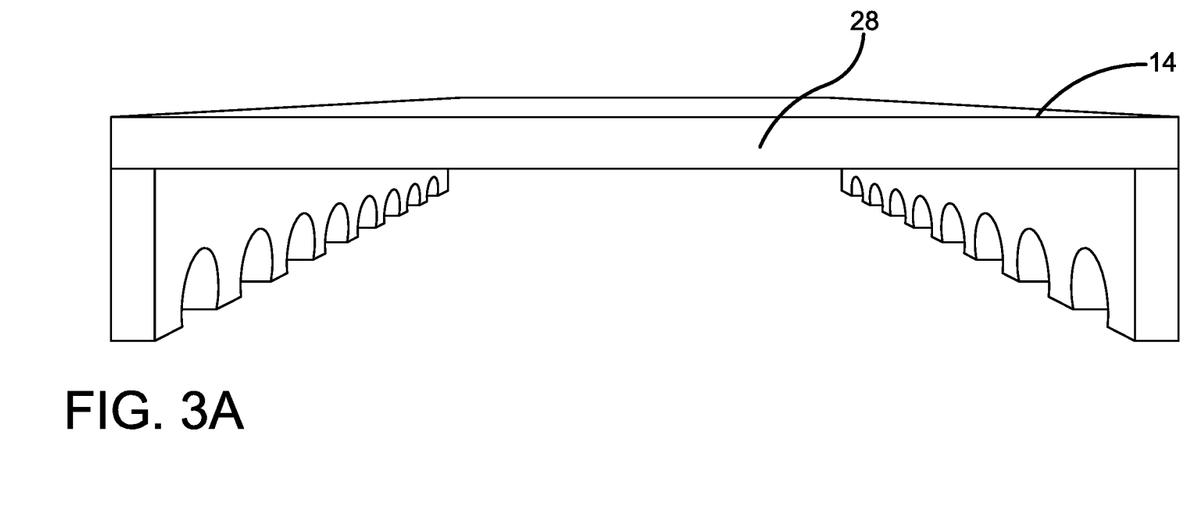
FIG. 3A and FIG. 3B are end views of the article showing its width and the perspective from an end of the article.
Figure 3B:
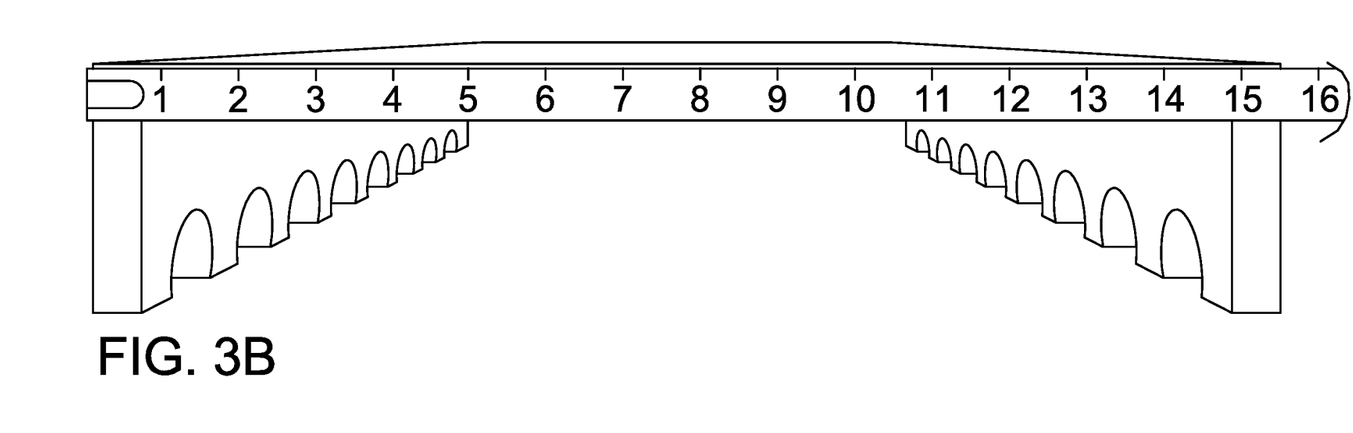

Similarly, with reference to FIG. 3A and FIG. 3B, an end view of the article 10 is shown, with FIG. 3A showing an end view of the article and FIG. 3B showing an end view of the article with a measurement tool superimposed over it.

Figure 4:
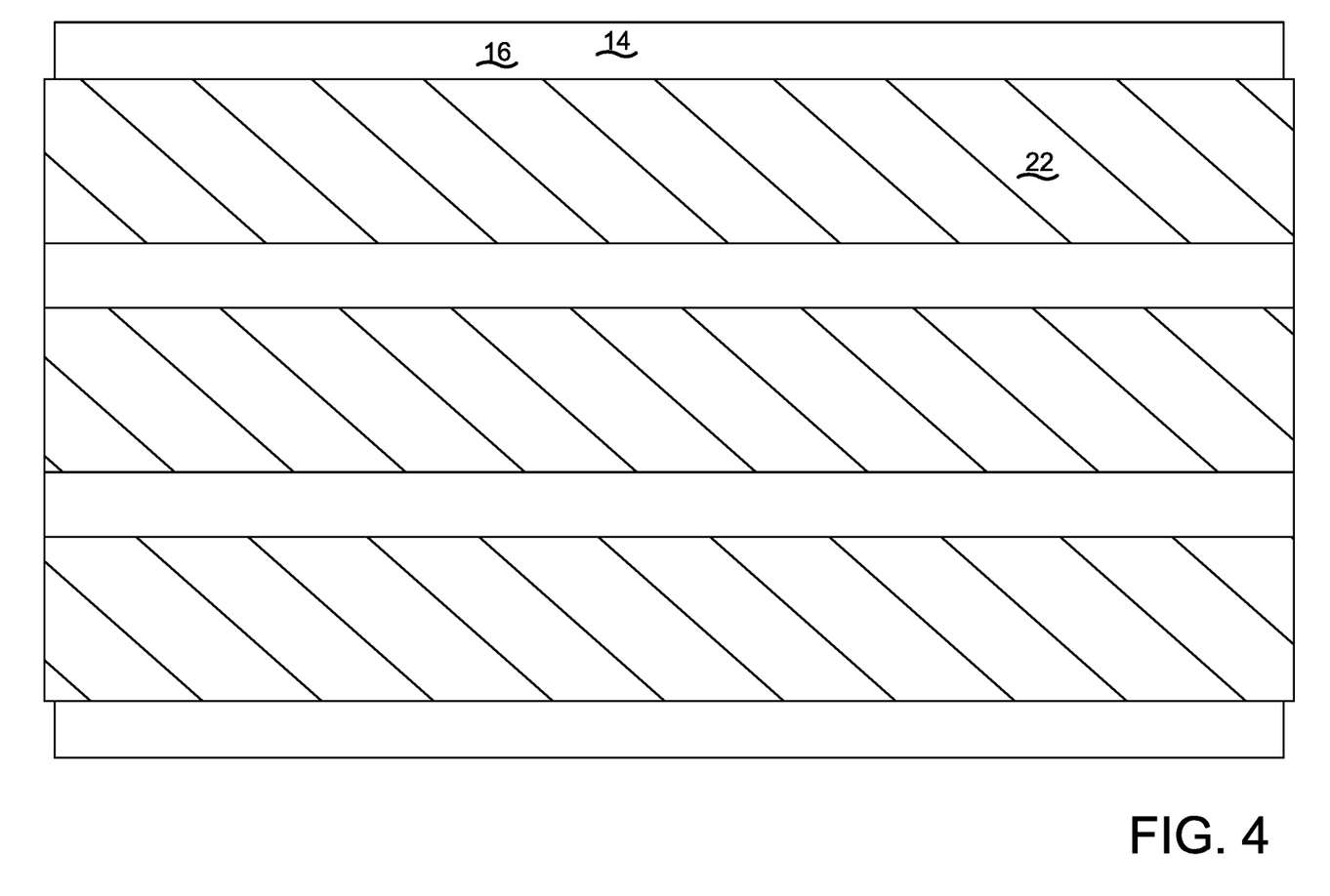
FIG. 4 is a top view of the article showing the top surface, the friction surface, and the graphically distinctive warning surface which may alternatively be added to the article.

With reference to FIG. 4, a top view of the article is illustrated. In this embodiment, an additional first element 22 has been added to enhance friction and visibility of the upper surface 16 of the platform member 14.

With reference to FIG. 3A and FIG. 3B, a first end 28 of platform member 14 is shown.

With reference to FIG. 4, the first element 22 is illustrated affixed to the upper surface 16 of a platform member 14. In contrast, with reference to FIG. 1, the article 10 is shown with no first element 22 attached to the upper surface 16 of the platform member 14.

Figure 5:
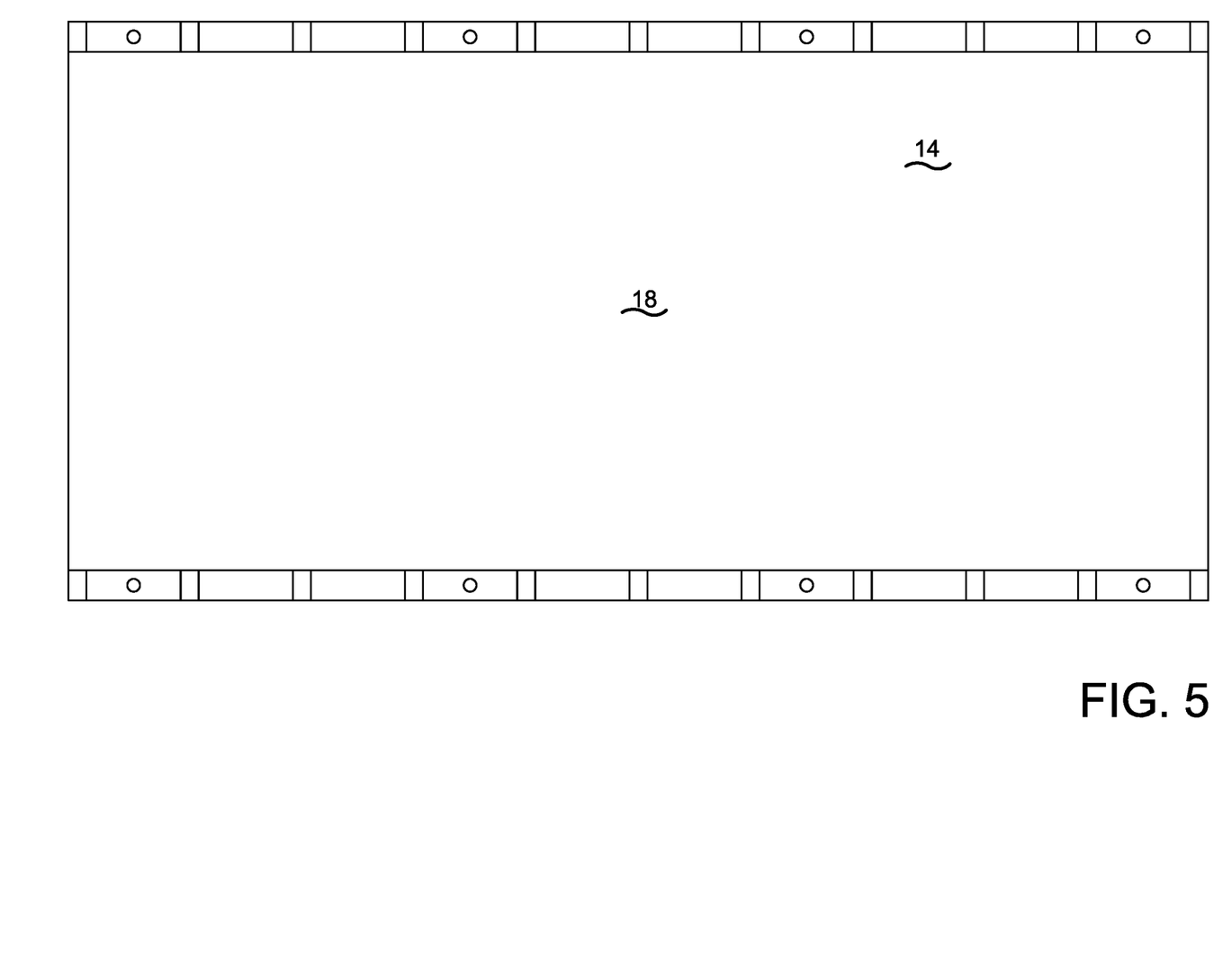
FIG. 5 is a bottom view of the article.

With reference now to FIG. 5, a bottom view of the article 10 is shown, with the lower surface 18 of the platform member 14 easily seen.

Figure 11:
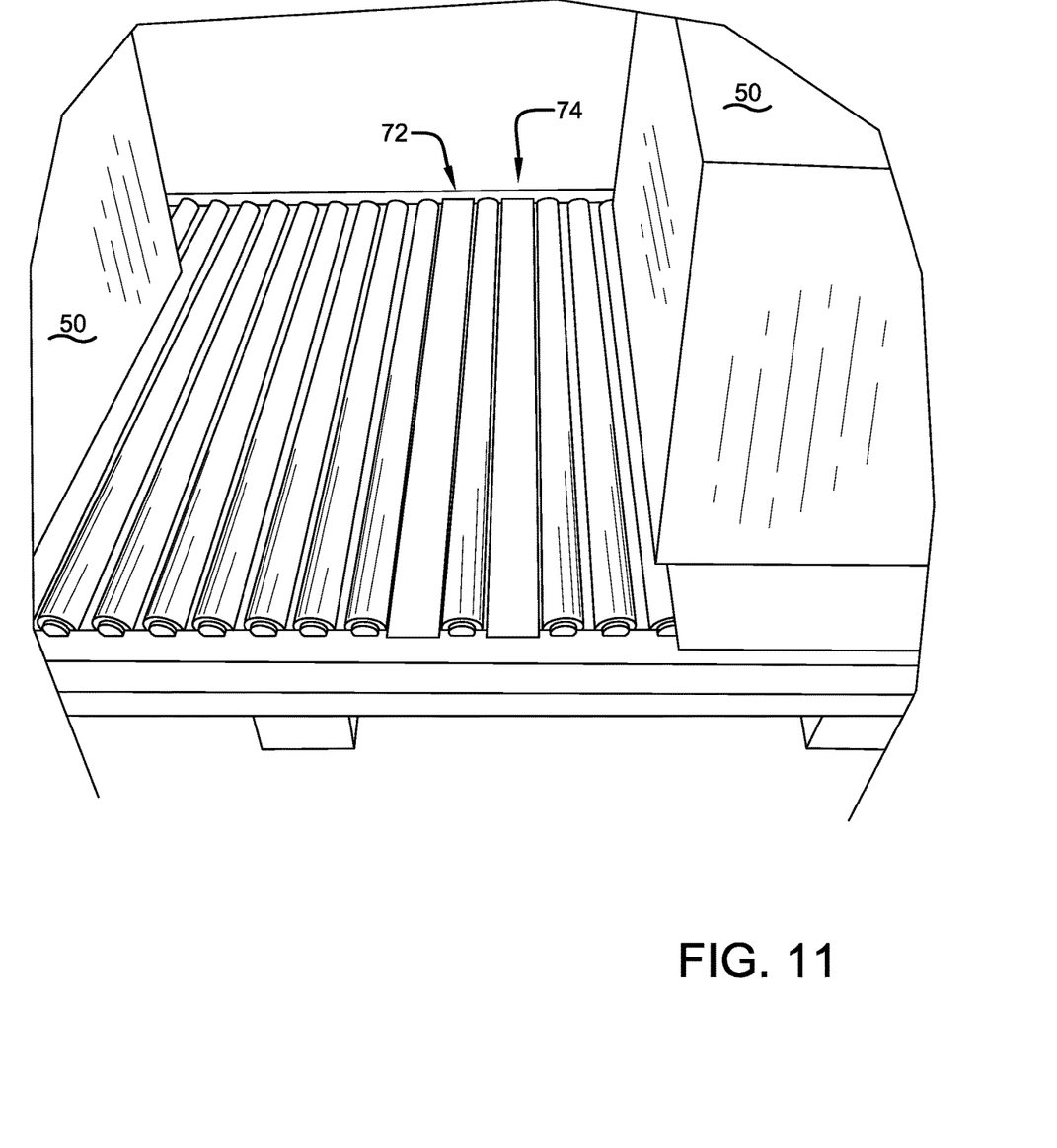
FIG. 11 is a perspective view of a different portion of a represented roller conveyor showing product moving down the roller conveyor as well as a pair of bridges used for a user to cross the conveyor.

With reference to FIG. 6, FIG. 10, and FIG. 11, the inventive article 10 is shown in its intended situation and use on an associated roller conveyor 30. The operation of the associated roller conveyor is well-known and will be briefly described herein. A plurality of individual rollers 34 are configured between two frame members 38 using bearings 42 (not shown). Generally, the rollers are powered and continue rolling under the article 10, enabling products to be placed on top of the rollers and easily move down the longitudinal center line 46 of the conveyor. For example, with reference to FIG. 11, associated product 50 is shown on the roller conveyor in operation.

Figure 7:
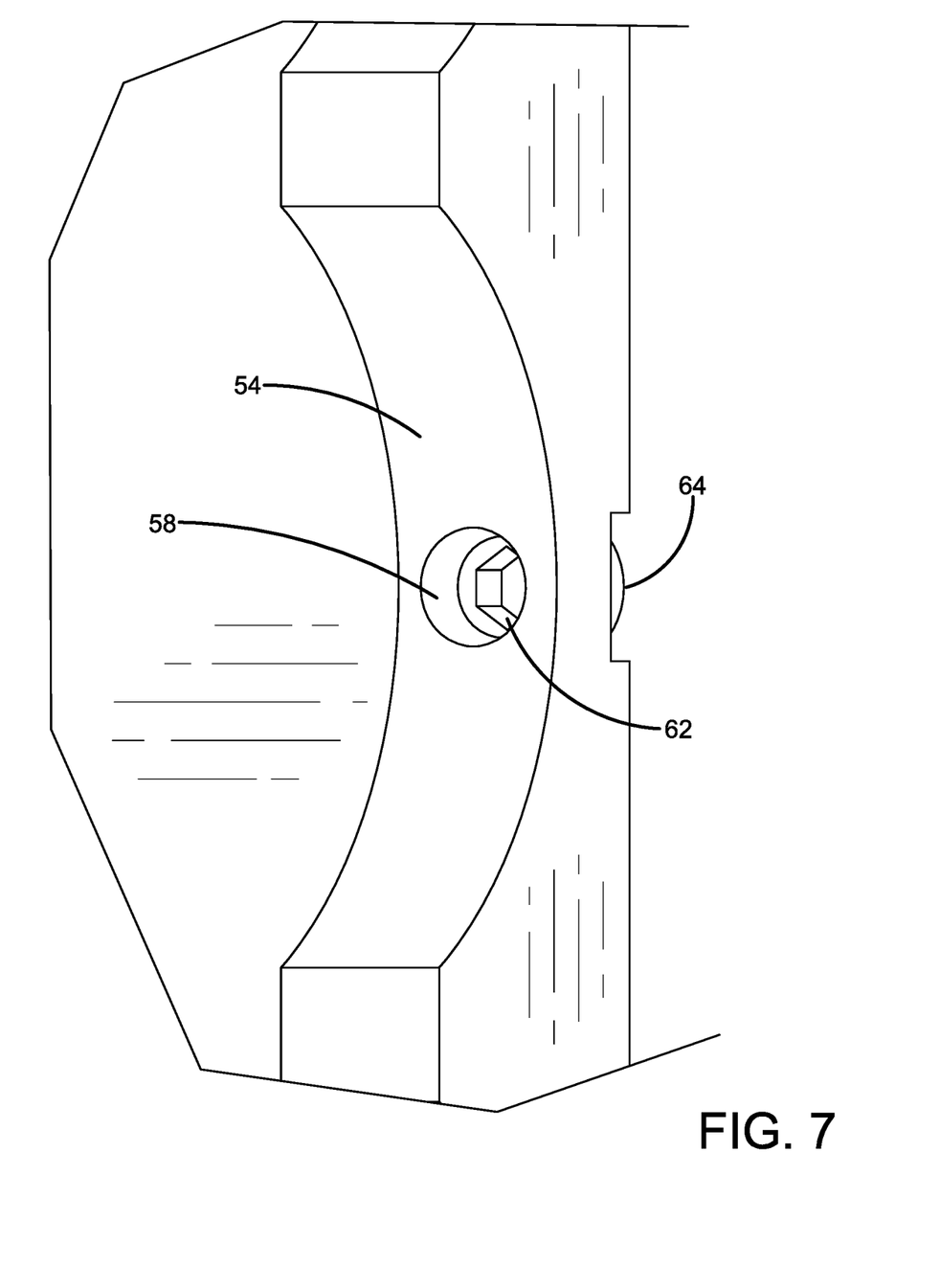
FIG. 7 is a close-up view of a recess in the article and especially showing a hole to receive a fastener.
Figure 8:
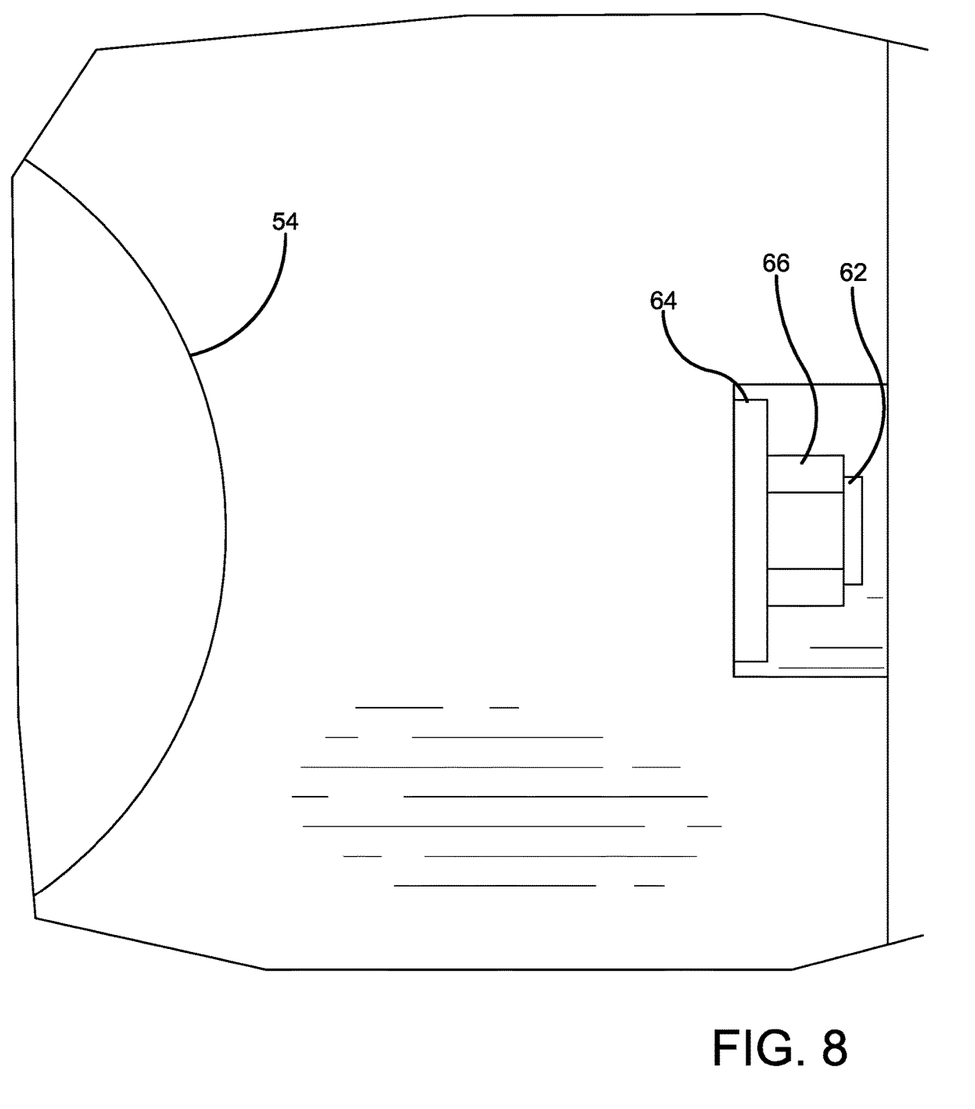
FIG. 8 is a close-up view of a recess in the article showing an element, such as a fastener.
Figure 9:
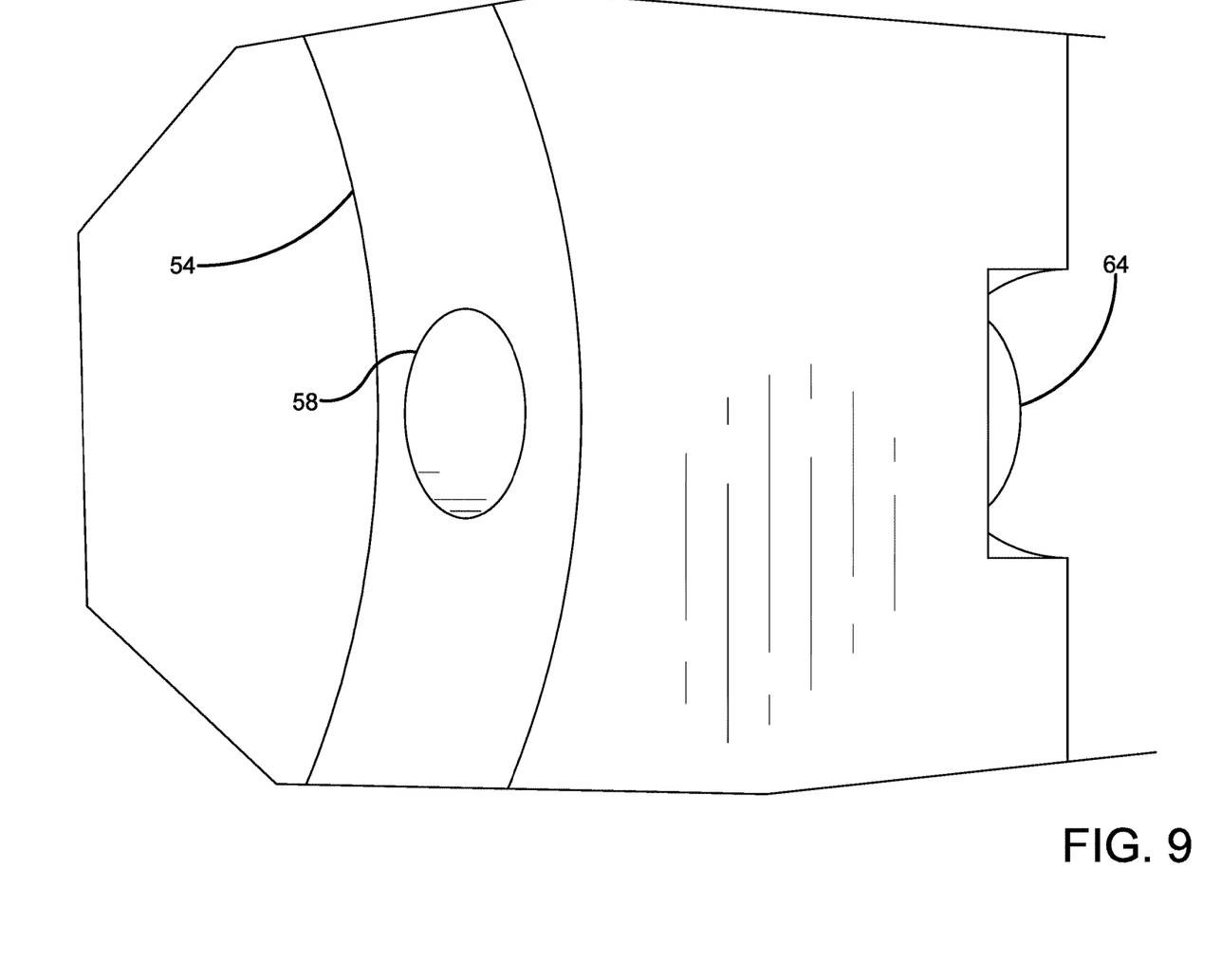
FIG. 9 is a close-up view of a recess in the article showing a hole and an element in operative relation.

With reference to FIG. 7, FIG. 8, and FIG. 9, a close-up view of the underside of a recess 54 is shown. In the preferred embodiment, as can be seen in FIG. 1, FIG. 2A, FIG. 5, and FIGS. 7-9, every third recess 54 has a hole 58. The hole 58 is operatively associated with fastening element 60. The element 60 can be any fastener chosen with sound engineering judgment, but the preferred fastener is a Allen head bolt threaded upwardly through hole 58 to preferably receive a washer and a nut, as shown in FIGS. 7 and 8. FIG. 7 shows the head of the Allen bolt 62 in the hole 58 while FIG. 8 shows the bolt 62 received by a washer 64 and nut 66. The element 60 and hole 58 work together to hold the first side member 66 and second side member 68 to the platform member 14.

Figure 14:
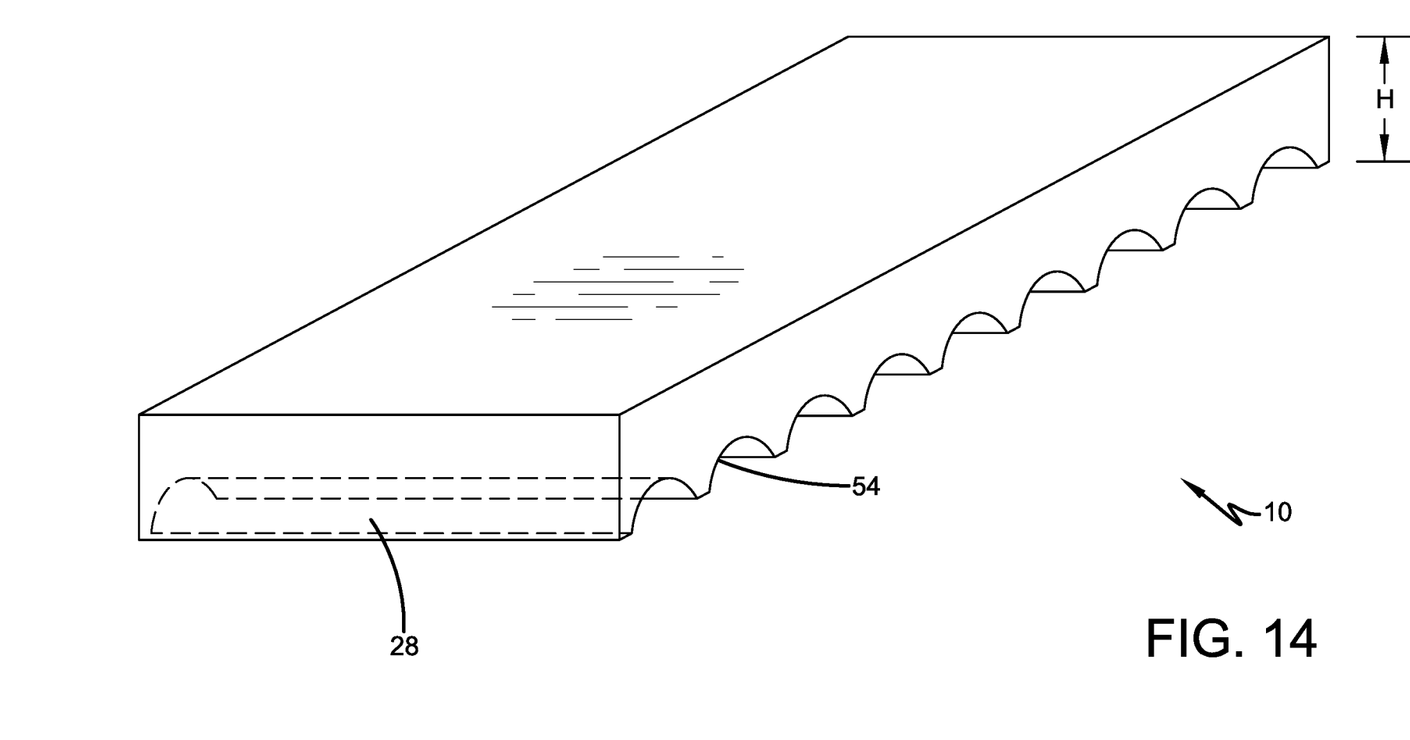
FIG. 14 shows a perspective view of the article in use on a roller conveyor in accordance with an alternative embodiment.
Figure 15:
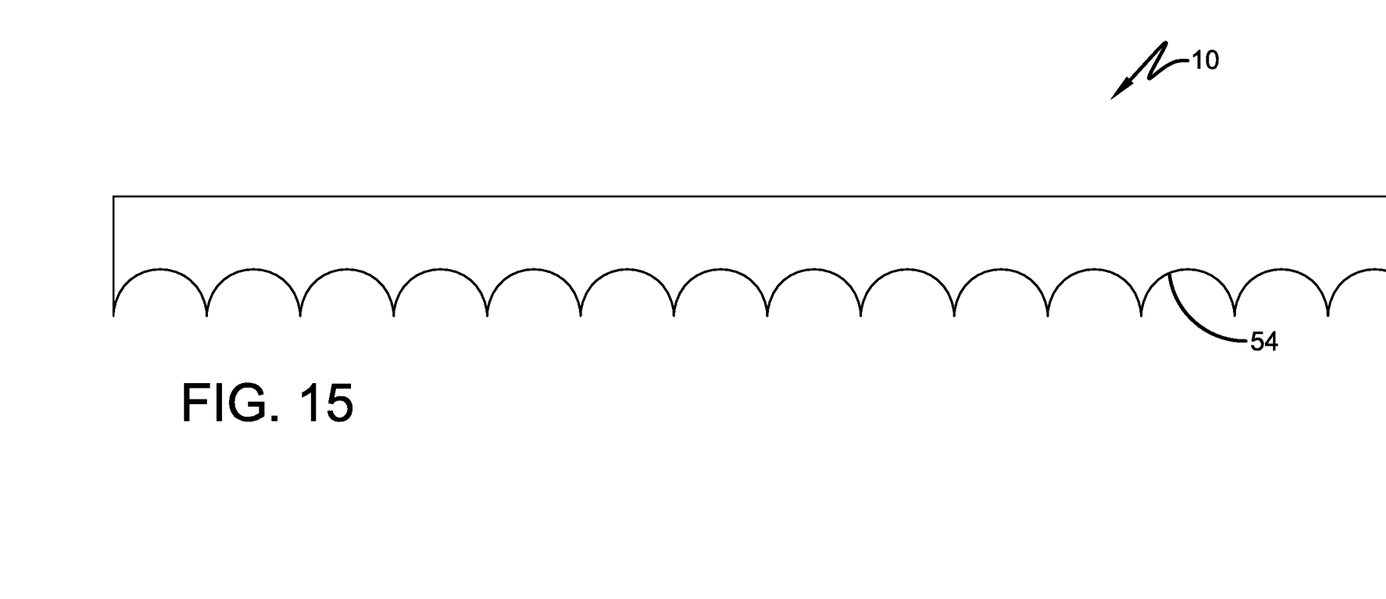
FIG. 15 shows a side view perspective of the embodiment of FIG. 14.

With reference to FIG. 14, alternate embodiments of the invention are shown. With reference to FIG. 14, and an alternate and currently un-preferred embodiment of the invention is shown. In this embodiment, a first end 28 of the platform is essentially the same height (H) as the rest of the article 10 rather than having a platform member 14 and first and second side members 68,68, this embodiment essentially is a solid piece of material, such as ultra-high molecular weight polyethylene, into which tunnels have been drilled longitudinally to create the recesses 54. These recesses 54 as shown in FIG. 15 still fit atop of the associated rollers 34 of an associated roller conveyor 30.

With reference now to FIG. 11, one embodiment of an associated roller conveyor 30 is shown. In this embodiment, two of the associated rollers 34 have been removed and replaced with a first board 72 and second board 74. These boards can be used for an associated user to walk across the roller conveyor 30. The invention helps eliminate the need for such boards.

Figure 12:
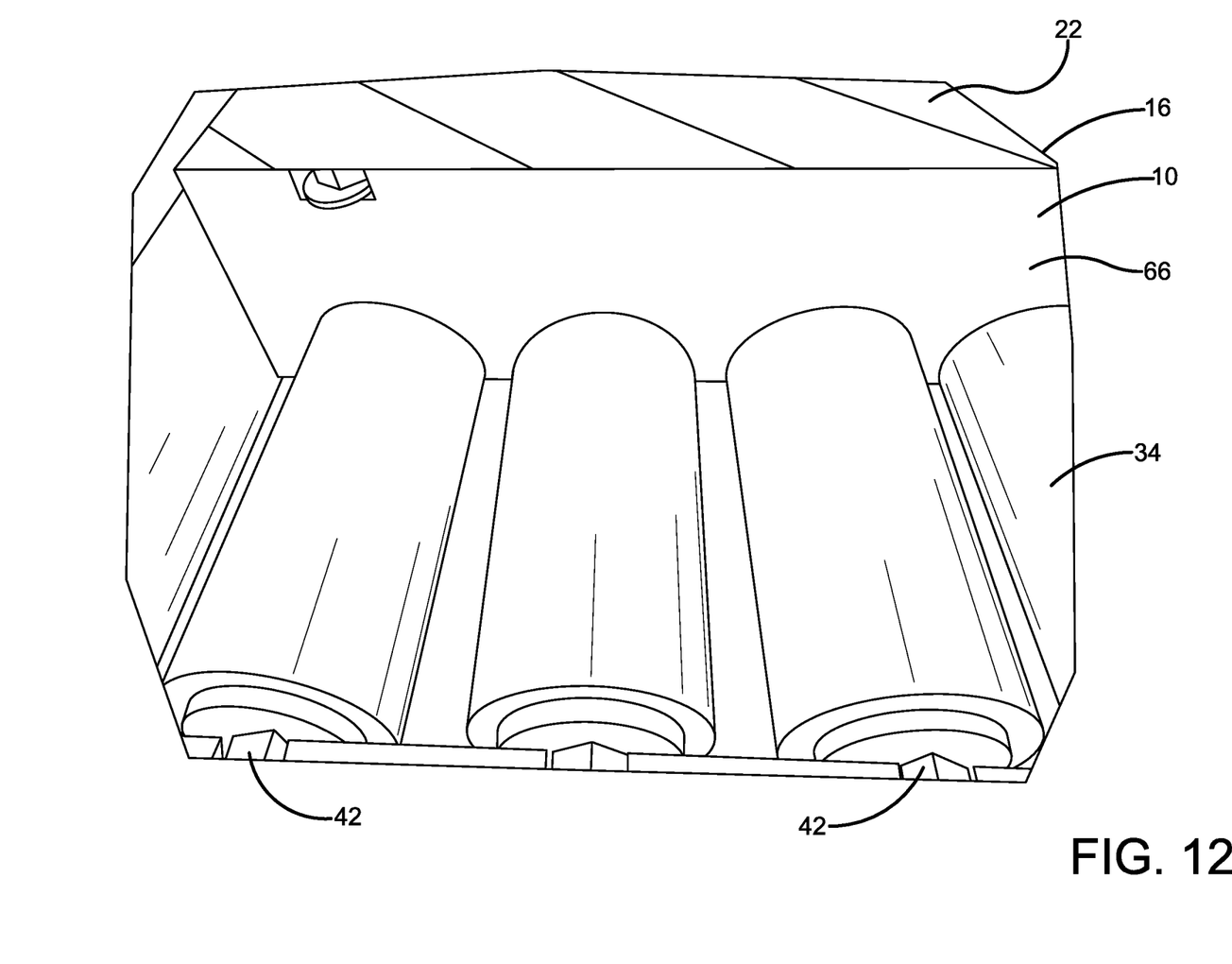
FIG. 12 shows a perspective close-up view of the article in use on a roller conveyor.

With reference now to FIG. 12, a close-up view of the inventive article 10 in operation is shown. As can be clearly seen, the article 10 is shown with the first element 22 on the upper surface 16 of the platform member 14. The first side member 66 is shown with four recesses 54 shown. The four recesses are operatively engaging four associated rollers 34, which are part of an associated roller conveyor 30.

With reference to FIG. 13, the inventive article 10 is shown in operation on an associated roller conveyor 30 with all ten recesses 54 operatively engaging the rollers 34 of the roller conveyor 30. In an embodiment shown in FIG. 13, the first element 22 is used to improve the friction between the upper surface 16 of the platform member 14 and the associated feet of the associated user. When the user is finished using the article 10, he simply steps off the article and lifts it from the rollers 34 of the roller conveyor 30.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. An article comprises:
   a platform member for standing on a roller conveyor; said platform member being generally planar and having an upper surface and a lower surface;
   first and second side members, an upper edge of one of said side members being attached to said lower surface of said platform member; said first and second side members each having a recesses extending from a lower edge of said first side member toward an upper edge of said first side member, each recess having a portion of a first curved surface;
   whereby said platform member may selectively and operatively be used with an associated roller conveyor; an associated user may selectively place said platform member onto the associated roller conveyor such that individual rollers of the roller conveyor selectively and operatively are received into said recesses of said platform member, so that the associated user may stand upright on said platform member while said platform member is on the associated roller conveyer.

2. An article as in claim 1 wherein a first portion of said first curved surface traces a first arc.

3. An article as in claim 2 wherein said first portion of said first arc is located nearest said upper edge of said first side member.

4. An article as in claim 1, wherein said first curved surface is semicircular.

5. An article comprises:
   a platform member for standing on a roller conveyor; said platform member being generally planar and having an upper surface and a lower surface; said lower surface of said platform member having recesses that selectively receive associated rollers of an associated roller conveyor, so that an associated user may stand upright on said platform member while said platform member is on the associated roller conveyer.

6. The article of claim 5 wherein the recesses in said platform member operatively receive the associated rollers of the roller conveyor so that the associated roller continues to selectively operatively turn while the platform member is in place on the associated roller conveyor.

7. An article comprises:
- a platform member; said platform member being generally planar and having an upper surface and a lower surface; said upper surface of said platform having a first element to enhance friction between said element and the associated feet of an associated user; said platform member having a width between 12 inches and 50 inches, and a depth between 6 inches and 60 inches, and a height between 3 inches and 10 inches; the platform being made of ultra-high-molecular-weight polyethylene of a thickness between 0.25 inches and 2.0 inches;
- first and second side members, an upper edge of one of said side members being attached to said lower surface of said platform member; said first side member having a first recess extending from a lower edge of said first side member toward an upper edge of said first side member, said first recess having a portion of a first curved surface; said first portion of said first curved surface traces a first arc which is essentially semicircular; said first side member also having second, third, fourth, fifth, sixth, seventh, eighth, ninth and tenth recesses similar to the first recess;
- whereby said platform member may selectively and operatively be used with an associated roller conveyor; an associated user may selectively place said platform member onto the associated roller conveyor such that the individual rollers of the roller conveyor selectively and operatively are received into said recesses of said platform member, so that the associated user may stand upright on said platform member while said platform member is on the associated roller conveyer.

8. A method of standing on a roller conveyor, the method comprising:
- providing a roller conveyer having a plurality of rollers able to rotate about their respective longitudinal axes;
- providing a platform member; said platform member being generally planar and having an upper surface and a lower surface and first and second side members, an upper edge of one of said side members being attached to said lower surface of said platform member; said first side member having a plurality of recesses extending from a lower edge of said first side member toward an upper edge of said first side member, a plurality of said plurality of recesses having a portion of a first curved surface;
- placing said platform member onto the roller conveyor such that said plurality of rollers of said roller conveyor selectively and operatively are received into said recesses of said platform member; and,
- standing on said platform member while said platform member is on the associated roller conveyer.

* * * * *